US008118362B2

(12) United States Patent
Nishimura et al.

(10) Patent No.: US 8,118,362 B2
(45) Date of Patent: Feb. 21, 2012

(54) VEHICLE SEAT

(75) Inventors: Seiya Nishimura, Okazaki (JP); Fumitoshi Akaike, Nissin (JP); Shoichi Yamanaka, Anjo (JP)

(73) Assignees: Toyota Boshoku Kabushiki Kaisha, Aichi-Ken (JP); Denso Corporation, Aichi-Pref. (JP)

( * ) Notice: Subject to any disclaimer, the term of this patent is extended or adjusted under 35 U.S.C. 154(b) by 293 days.

(21) Appl. No.: 12/607,345

(22) Filed: Oct. 28, 2009

(65) Prior Publication Data

US 2010/0109390 A1    May 6, 2010

(30) Foreign Application Priority Data

Oct. 30, 2008  (JP) ................................. 2008-279640

(51) Int. Cl.
*A47C 31/00* (2006.01)
(52) U.S. Cl. ............... 297/217.3; 297/217.1; 297/217.2; 297/180.12; 340/440; 340/457.1
(58) Field of Classification Search .... 297/217.1–217.3, 297/180.12; 340/440, 457.1
See application file for complete search history.

(56) References Cited

U.S. PATENT DOCUMENTS

| 6,371,552 | B1 * | 4/2002 | Narita et al. | 297/180.12 |
| 7,134,715 | B1 * | 11/2006 | Fristedt et al. | 297/180.12 |
| 7,500,536 | B2 * | 3/2009 | Bulgajewski et al. | 180/273 |
| 2002/0093236 | A1 * | 7/2002 | Inoue | 297/452.48 |
| 2004/0021346 | A1 * | 2/2004 | Morinet et al. | 297/180.12 |
| 2007/0290532 | A1 * | 12/2007 | Frank | 297/180.12 |
| 2009/0227913 | A1 | 9/2009 | Moriyama et al. | |

FOREIGN PATENT DOCUMENTS

JP    6-206436    7/1994

OTHER PUBLICATIONS

English language Abstract of JP 6-206436, Jul. 26, 1994.

* cited by examiner

*Primary Examiner* — Laurie Cranmer
(74) *Attorney, Agent, or Firm* — Greenblum & Bernstein, P.L.C.

(57) ABSTRACT

A vehicle seat is provided. The vehicle seat includes a sheet-like sensor member, a sheet-like electric device, and a seat main body configuring a sitting portion and including therein the sensor member and the electric device while overlapping each other. The electric device is provided between a pad member which forms a cushion element of the seat main body and a skin cover which covers an outer surface side of the pad member, and the sensor member is provided between the electric device and the skin cover. The electric device is formed with a through hole, so that a measuring circuit unit which is wired and connected to the sensor member is provided in an inner surface side of the electric device, and the measuring circuit unit is accommodated in a recessed portion formed in the pad member.

10 Claims, 3 Drawing Sheets

VEHICLE SEAT

BACKGROUND OF THE INVENTION

1. Field of the Invention

The present invention relates to a vehicle seat, and more particularly, to a vehicle seat including a sheet-like sensor member and a sheet-like electric device while overlapping each other in an interior of a seat main body which configures a sitting portion.

2. Description of the Related Art

A related-art vehicle seat includes a sheet-like heater device provided in a sitting surface portion of a seat cushion. For example, JP-A-H6-206436 describes a sheet-like heater device which is provided in a layer between a skin cover and a cushion pad of a seat cushion. In this publication, the heater device is provided to be laid out widely over the entire of a sitting surface portion of the seat cushion so that the heater device is brought into wide contact with the buttock and thigh of a sitting person.

However, in the related art, it cause a configuration problem to provide a sheet-like sitting sensor for detecting a sitting condition of the sitting person within a layer between the heater device and the skin cover in an overlapping manner. Specifically, in a case where the sitting sensor is provided together with a sheet-like electric device such as the heater device, it is preferable that the sitting sensor be provided on an outer surface side of the sheet-like electric device so as to close to the sitting surface than the electric device in order to improve sensitivity of the sitting sensor.

In addition, in an electrostatic condenser type sensor element which is used generally as the sheet-like sitting sensor, unless a measuring circuit unit thereof is installed close to a measuring electrode surface, noise is likely to occur. It is conceivable that the measuring circuit unit is provided together with the measuring electrode surface in an overlapping manner on the outer surface side of the heater device. However, since the measuring circuit unit is installed to project from the sitting surface, the sitting quality or comfortableness and external appearance of the seat would be deteriorated.

Further, in order to solve the problem, for example, a recessed accommodation groove may be provided in a part of the outer surface portion of the cushion pad for accommodating the measuring circuit unit therein. However, since the heater device lays below the measuring circuit unit, the measuring circuit unit cannot be accommodated therein in a good condition.

SUMMARY OF THE INVENTION

It is an aspect of the present invention to provide a vehicle seat including a sheet-like sensor member and a sheet-like electric device such as a heater device provided within an interior of a seat main body in an overlapping manner, wherein a measuring circuit unit of the sensor member can be provided in the interior of the seat main body suitably.

According to an exemplary embodiment of the present invention, there is provided a vehicle seat including a sheet-like sensor member, a sheet-like electric device; and a seat main body configuring a sitting portion and including therein the sensor member and the electric device while overlapping each other. The electric device is provided between a pad member which forms a cushion element of the seat main body and a skin cover which covers an outer surface side of the pad member, and the sensor member is provided between the electric device and the skin cover. The electric device is formed with a through hole, so that a measuring circuit unit which is wired and connected to the sensor member is provided in an inner surface side of the electric device, and the measuring circuit unit is accommodated in a recessed portion formed in the pad member.

According to another exemplary embodiment of the present invention, there is provided a vehicle seat including a seat main body including a pad member which configures a cushion element, and a skin cover which covers the pad member, a sheet-like sensor member, and a sheet-like electric device. The sheet-like sensor member and the sheet-like electric device are overlapped with each other and provided between the pad member and the skin cover. One of the sensor member and the electric device includes a control unit connected thereto through a wiring and laminated on the other of the sensor member and the electric device. The other of the sensor member and the electric device is formed with a through hole, through which the wiring passes.

DETAILED DESCRIPTION

Hereinafter, an exemplary embodiment of the present invention will described with reference to the accompanying drawings.

Embodiment 1

Figure 1:
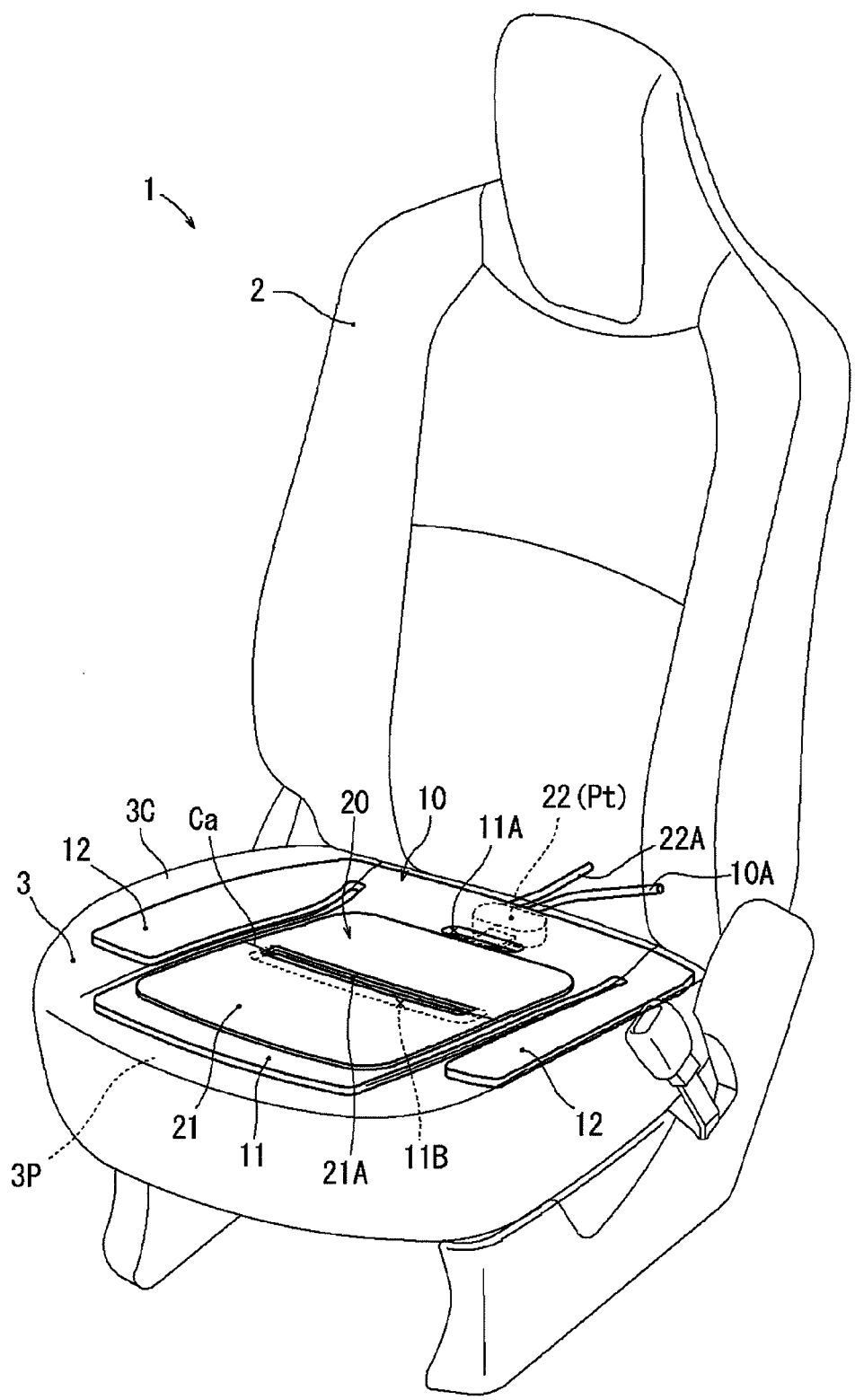
FIG. 1 is a perspective view showing a schematic configuration of a vehicle seat according to Embodiment 1.

The configuration of a vehicle seat according to Embodiment 1 will be described with reference to FIGS. 1 to 4. As is shown in FIG. 1, in this vehicle seat, a seat main body 1 which configures a sitting portion includes a seatback 2 configuring a backrest and a seat cushion 3 configuring a sitting portion. Here, lower end portions of the seatback 2 are connected to rear end portions of the seat cushion 3 via a reclining device (not shown) at left and right sides, respectively.

Figure 2:
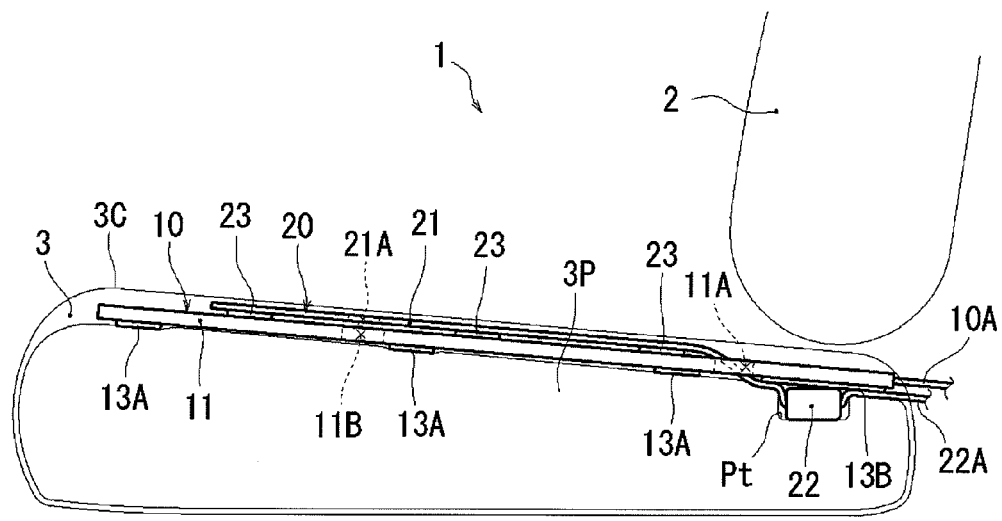
FIG. 2 is a side view showing a state after installation of a sensor element and a heater device.

With this configuration, as is shown in FIG. 2, the seatback 2 is connected to the seat cushion 3 in such a state that a lower end portion of the seatback 2 rides on or above a rear end of the seat cushion 3. As shown in FIG. 1, the seat cushion 3 includes a sheet-like heater device 10 which is provided for and warms up the buttock portion and the thigh portions of a sitting person and a sheet-like sensor member 21 of a sensor element 20 which functions as a sitting sensor in an interior of a sitting surface portion thereof in an overlapping manner.

The heater device 10 and the sensor member 21 are formed of flexible soft sheet-like members and overlapping each other between a pad member 3P which forms a cushion element of the seat cushion 3 and a skin cover 3C which covers an outer surface side of the pad member 3P. The pad member 3P is formed by foam molding of a synthetic resin having elasticity such as soft urethane foam.

The heater device 10 has a shape integrally including a rectangular sheet-like center surface portion 11 which is laid out in the central sitting surface portion of the seat cushion 3 and rectangular sheet-like side surface portions which are laid out in side support portions which are formed to be swollen at both side portions of the seat cushion 3. The swollen shapes of the respective side support portions are formed by both the side portions of the pad member 3 being gradually swollen from a central portion towards both outer sides thereof.

With this configuration, the respective side support portions of the seat cushion 3 are formed so that respective surfaces thereof which are provided for the thigh portions of the sitting person are inclined inwardly, whereby the side support portions face outer sides of the thigh portions of the sitting person. The sheet-like heater device 10 which is laid out on an upper surface of the pad member 3P is installed so as to be widely provided for the buttock portion and thigh portions of the sitting person by a center surface portion 11 and side surface portions 12, 12 of the sheet-like heater device 10.

Figure 3:
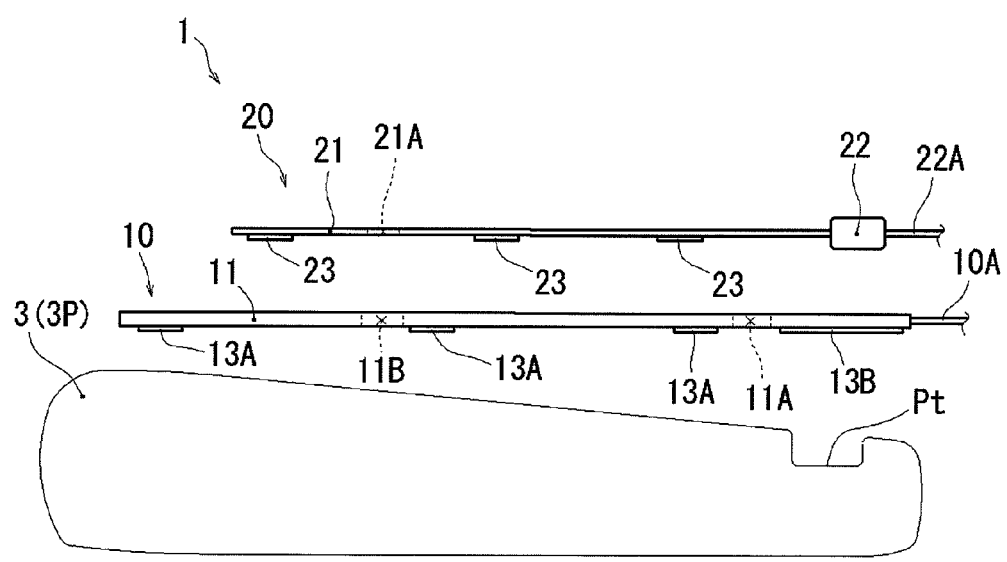
FIG. 3 is a side view showing a state before installation of the sensor element and the heater device.

As shown in FIGS. 2 to 3, the heater device 10 is affixed to an upper surface portion of the pad member 3P by means of a plurality of adhesive sheets 13A, 13B which are securely affixed to a lower surface of the heater device 10. A recessed portion Pt which can accommodate in an interior thereof a measuring circuit unit 22 of a sensor element 20, which will be described later, is formed at a rear end portion of the pad member 3P. Specifically, the recessed portion Pt is formed in the upper surface portion of the pad member 3P and directly below the seatback 2.

Figure 4:
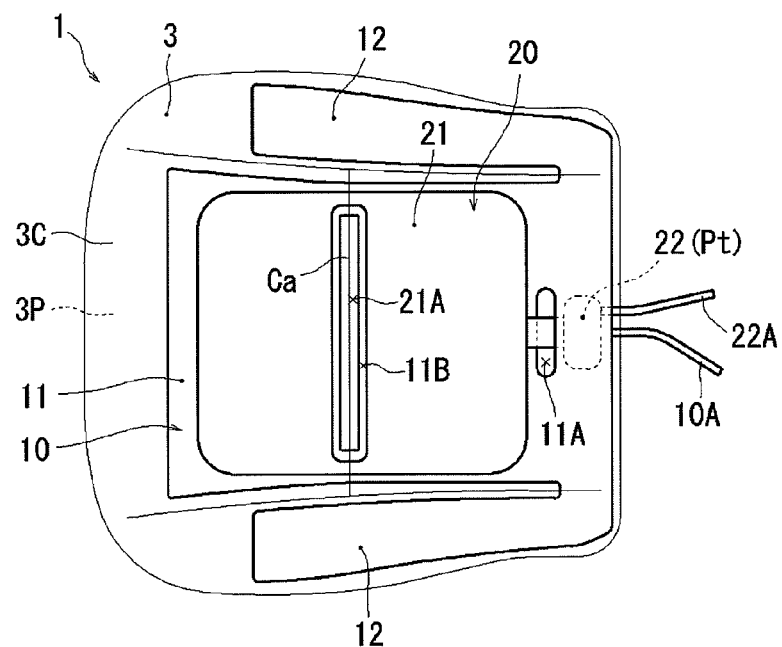
FIG. 4 is a plan view showing the state after installation of the sensor element and the heater device.

As shown in FIG. 4, this recessed portion Pt is formed at a central portion of the pad member 3P in a width direction. In addition, as shown in FIG. 2, the sheet-like heater device 10 is affixed to the upper surface portion of the pad member 3P to thereby be affixed to the pad member 3P by means of the adhesive sheet 13B, such that the sheet-like heater device 10 functions as a lid which covers the recessed portion Pt from the above. The heater device 10 according to this exemplary embodiment has a known heater configuration which has a function to warm up the buttock and thigh portions of the sitting person.

Specifically, the heater device 10 is configured such that a base is made of a sheet-like material having flexibility such as felt, heater wires (not shown) are laid out on this sheet-like material, and further, a feeding lead wire 10A is laid out to be connected thereto for supplying power to the heater wires. As shown in each of FIGS. 1 to 4, a through hole 11A is formed in the center surface portion 11 of the heater device 10 at a rear end thereof. This through hole 11A extends in a transverse width direction (left and right direction).

The through hole 11A is formed as a passage through which the measuring circuit unit 22 of the sensor element 20, which will be described later, passes from an upper surface side (an outer surface side) to a lower surface side (an inner surface side) of the center surface portion 11. In addition, as shown in FIGS. 1 and 4, an escape hole 11B is formed in the center surface portion 11 at a center in a front and rear direction. This escape hole 11B has a shape extending longer than the through hole 11A in the transverse width direction.

An escape hole 21A is also formed in the sheet-like sensor member 21 which is laminated on the upper surface side of the center surface portion 11. This escape hole 21A extends long in the transverse width direction in the same manner as the escape hole 11B. These escape holes 11B, 21A are formed at a position which lies along and directly below a suspension line Ca of the skin cover 3C, along which the skin cover 3C is suspended. These escape holes 11B, 21A are formed as a through hole, through which the suspension line Ca of the skin cover 3C is suspended to be hooked in a suspension groove in the pad member 3P (not shown).

Next, the configuration of the sensor element 20 which configures a sitting sensor will be described. This sensor element 20 has a known electrostatic condenser type sensor configuration. Specifically, as shown in FIG. 3, the sensor element 20 includes the sheet-like sensor member 21 on which a measuring electrode surface (not shown) is installed, the measuring circuit unit 22 which is wired to be connected to the measuring electrode surface of the sensor member 21, and a connection line 22A which wires and connects the measuring circuit unit 22 with a control unit (not shown) which is provided on a body side.

The sensor element 20 has the electrostatic condenser type sensor configuration. The measuring circuit unit 22 is provided at a position close to the measuring electrode surface of the sensor member 21 to thereby measure a variation in electrostatic capacity with good accuracy, and therefore, a sitting condition can be detected with high sensitivity. Because of this, in this exemplary embodiment, the measuring circuit unit 22 is also placed on the upper surface portion of the pad member 3P of the seat cushion 3 together with the sensor member 21, so as to be disposed in the position which lies relatively close to the sensor member 21.

Specifically, the sensor member 21 is provided to overlap the upper surface (the outer surface) of the center surface portion 11 of the heater device 10. As shown in FIG. 4, this sensor member 21 is formed into a rectangular sheet-like shape which is slightly smaller than the center surface portion 11 of the heater device 10. By providing the sensor member 21 to overlap the upper surface of the center surface portion 11, the sensor member 21 is allowed to be disposed in a position which covers lower surface of the buttock and thigh portions of the sitting person.

As shown in FIGS. 2 to 3, the sensor member 21 is provided to be affixed to the upper surface portion of the heater device 10 by means of a plurality of adhesive sheets 23 which are securely affixed to a lower surface portion of the sensor member 21. In addition, the measuring circuit unit 22, which is wired to be connected to a rear portion of the sensor member 21, passes through the through hole 11A formed in the heater device 10 so that the measuring circuit unit 22 is provided in a lower surface side (an inner surface side) of the heater device 10 and accommodated within the recessed portion Pt formed at the rear end portion of the pad member 3P.

When causing the measuring circuit unit 22 to pass through the through hole 11A in the heater device 10, in a case where a connecting wire 22A is detachable relative to the measuring circuit unit 22, the connecting wire 22A is detached from the measuring circuit unit 22 before the measuring circuit unit 22 is passed through the through hole 11A. Alternately, in a case where the connecting wire 22A is detachable relative to other connecting wires, the connecting wire 22A is detached accordingly, and the connecting wire 22A so detached is first passed through the through hole 11A, followed by the passage of the measuring circuit unit 22. With this configuration, irrespective of the fact that the sensor member 21 is installed on the upper surface side of the heater device 10, the measuring circuit unit 22 still can be passed through to the lower surface side of the heater device 10 for accommodation within the recessed portion Pt on the pad member 3P.

Alternatively, in a case where a wiring connecting the measuring circuit unit 22 and the measuring electrode surface of the sensor member 21 is detachable from the measuring circuit 22 or the sensor member 21, the wiring is detached and passed through the thorough hole 11A and connected in a state where the measuring circuit unit is provided in the inner surface side.

In this way, according to the vehicle seat of the exemplary embodiment, the measuring circuit unit 22 can be suitably accommodated directly in the interior of the recessed portion Pt on the pad member 3P without the sheet-like body of the heater device 10 being involved therebetween. In addition, by providing the sensor member 21 on the outer surface side of the heater device 10, the sensor member 21 is allowed to have good detection sensitivity.

In addition, by providing the measuring circuit unit 22 at the position directly below the seat back 2, the measuring circuit unit 22 is not likely to be subjected to the effect of a pressing load generated when the sitting person is sitting on the seat main body 1. Consequently, the sitting person rarely feels foreign-body sensation for the measuring circuit unit 22. In addition, since the soft sheet-like heater device 10, which is overlapped on the pad member 3 is provided over the hard measuring circuit unit 22 as in the form of a lid for covering the measuring circuit unit 22, the sitting person rarely feels foreign-body sensation for the measuring circuit unit 22.

Additionally, although the fact that the sheet-like sensor member 21 is installed on the upper surface side (the outer surface side) of the heater device 10, the heater device 10 can exhibit its function to warm up the buttock portions and thigh portions of the sitting person by virtue of heat generated by the heater device 10 being energized. In addition, by providing the sensor member 21 in the outer surface side closer to the sitting surface than the heater device 10, the sensor member 21 can detect a sitting condition of the sitting person with good sensitivity. Consequently, both the heater device 10 and the sensor member 21 can perform well.

While the present invention has been shown and described with reference to certain exemplary embodiments thereof, it will be understood by those skilled in the art that various changes in form and details may be made therein without departing from the spirit and scope of the invention as defined by the appended claims.

For example, in the exemplary embodiment, while the heater device 10 is described as the sheet-like electric device which is laid out on the inner surface side of the sensor member 21, the present invention is not limited to the heater device 10.

Any device or equipment can be used, provided that it works when energized. It is noted that such device or equipment needs to effectively exhibit its function based on energization even if the device or equipment is provided below the sensor member 21.

Further, in an exemplary embodiment, a sheet-like electric device may be provided above a sensor member if a control unit connected to the sheet-like electric device via a wiring needs to be provided close to the electric device. In this case, the sensor member may be formed with a through hole, through which the wiring passes.

In addition, while the sensor member 21 and the electric device (the heater device 10) are described as being configured to be installed in the interior of the seat cushion 3, the invention present invention may also be applied to a configuration in which they are installed in an interior of the seatback 2.

Figure 5:
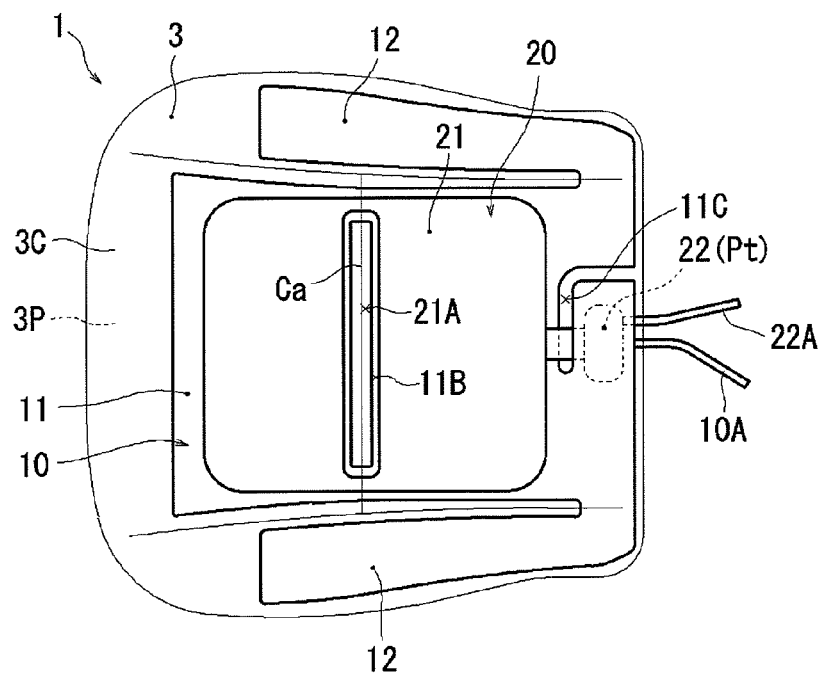
FIG. 5 is a plan view of a vehicle seat shown as a modified embodiment.

In addition, as is shown in FIG. 5, the through hole which is formed in the heater device 10 (the electric device) so as to allow the passage of the measuring circuit unit 22 may be configured as a slit 11C which extends continuously from a rear edge portion of the heater device 10. With this configuration, the measuring circuit unit 22 is allowed to be provided in the inner surface side of the heater device 10 by a wire connecting the measuring circuit unit 22 with the sensor member 21 being passed through the slit 11C without the measuring circuit unit 22 itself being passed through an interior of the slit.

What is claimed is:

1. A vehicle seat comprising:
   a sheet-like sensor member;
   a sheet-like electric device; and
   a seat main body configuring a sitting portion and including therein the sensor member and the electric device while overlapping each other,
   wherein the electric device is provided between a pad member which forms a cushion element of the seat main body and a skin cover which covers an outer surface side of the pad member, and the sensor member is provided between the electric device and the skin cover, and
   wherein the electric device is formed with a through hole, so that a measuring circuit unit which is wired and connected to the sensor member is provided in an inner surface side of the electric device, and the measuring circuit unit is accommodated in a recessed portion formed in the pad member.

2. The vehicle seat according to claim 1,
   wherein a wiring connecting the sensor member and the measuring circuit unit passes the through hole formed in the electric device.

3. The vehicle seat according to claim 2,
   wherein the through hole is configured as a slit which is connected to an edge of the electric device, through which the wiring passes so that the measuring circuit unit is provided in the inner surface side of the electric device.

4. The vehicle seat according to claim 1,
   wherein the through hole is configured such that the measuring circuit unit passes the through hole.

5. The vehicle seat according to claim 1,
   wherein both the sensor member and the electric device are provided within a seat cushion configuring the sitting portion,
   wherein a lower end portion of a seatback configuring a backrest is provided on a rear end portion of the seat cushion, and
   wherein the recessed portion in the pad member is provided at a position where the lower end portion of the seatback is provided thereabove.

6. The vehicle seat according to claim 1,
   wherein the sheet-like electric device is provided to cover the recessed portion formed in the pad member.

7. The vehicle seat according to claim 1,
   wherein the sensor member includes a measuring electrode surface of an electrostatic condenser type sensor element for detecting a sitting condition of a sitting person, and
   wherein the electric device is configured as a sheet-like heater device for warming up a portion of the sitting person which is brought into contact therewith by heat generated by the electric device being energized.

8. A vehicle seat comprising:
   a seat main body including a pad member which configures a cushion element, and a skin cover which covers the pad member;
   a sheet-like sensor member; and
   a sheet-like electric device, the sheet-like sensor member and the sheet-like electric device being overlapped with each other and provided between the pad member and the skin cover, wherein one of the sensor member and the electric device includes a control unit connected thereto through a wiring and laminated on the other of the sensor member and the electric device, and wherein the other of the sensor member and the electric device is formed with a through hole, through which the wiring passes.

9. The vehicle seat according to claim 8,
wherein the control unit is accommodated in a recessed portion formed in the pad member.

10. The vehicle seat according to claim 9,
wherein the seat main body includes a seatback provided above the pad member at a rear side thereof, and
wherein the recessed portion is formed in the pad member below the seatback.

* * * * *